(12) United States Patent
Zhou et al.

(10) Patent No.: US 10,686,511 B2
(45) Date of Patent: Jun. 16, 2020

(54) SIMULTANEOUS COMMUNICATION THROUGH MULTIPLE BEAMS OF A WIRELESS NODE

(71) Applicant: Facebook, Inc., Menlo Park, CA (US)

(72) Inventors: Hongyu Zhou, Canoga Park, CA (US); Qi Qu, Irvine, CA (US); Sam Padinjaremannil Alex, Dublin, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/995,523

(22) Filed: Jun. 1, 2018

(65) Prior Publication Data

US 2018/0375550 A1 Dec. 27, 2018

Related U.S. Application Data

(60) Provisional application No. 62/524,424, filed on Jun. 23, 2017.

(51) Int. Cl.
*H04B 7/06* (2006.01)
*H04B 7/0408* (2017.01)
(Continued)

(52) U.S. Cl.
CPC ............ *H04B 7/0686* (2013.01); *H01Q 3/24* (2013.01); *H01Q 3/2682* (2013.01); *H01Q 3/46* (2013.01); *H04B 1/0067* (2013.01); *H04B 1/0483* (2013.01); *H04B 7/0408* (2013.01); *H04B 7/0617* (2013.01); *H04B 7/0667* (2013.01); *H04B 7/0691* (2013.01); *H04B 7/0695* (2013.01); *H04W 16/10* (2013.01); *H04W 72/046* (2013.01); *H04W 72/082* (2013.01); *H04W 72/1231* (2013.01)

(58) Field of Classification Search
CPC .. H04B 7/0408; H04B 7/0686; H04B 7/0691; H04B 7/0617; H04B 7/0695; H04W 72/1263; H04W 72/046; H04W 72/1231; H04W 16/28
See application file for complete search history.

(56) References Cited

U.S. PATENT DOCUMENTS 6,178,333 B1 * 1/2001 Feuerstein ............. H01Q 1/246
342/373
9,215,622 B1 * 12/2015 Kinamon ............. H04B 7/0857
(Continued)

*Primary Examiner* — Joshua Kading
(74) *Attorney, Agent, or Firm* — Brian R. Short

(57) ABSTRACT

Apparatuses, methods, and systems for simultaneous communication through multiple beams of a wireless node, are disclosed. One apparatus includes a node, that includes a beamforming network, an antenna array, and a controller. The beamforming network operates to receive a plurality of communication signals and generate a plurality of delayed signals. The antenna array generates an antenna pattern that includes a plurality of beams, wherein the plurality of beams is divided into a plurality of groups. The controller operates to control simultaneous communication of the node with a plurality of transceivers, including the node communicating with a first transceiver through a selected beam of a first group of beams and simultaneously the node communicating with another transceiver through a corresponding beam of another group of beams.

17 Claims, 9 Drawing Sheets

(51) Int. Cl.

| | | |
|---|---|---|
| *H04W 72/12* | (2009.01) | |
| *H04W 72/08* | (2009.01) | |
| *H01Q 3/26* | (2006.01) | |
| *H04B 1/04* | (2006.01) | |
| *H04W 16/10* | (2009.01) | |
| *H04W 72/04* | (2009.01) | |
| *H04B 1/00* | (2006.01) | |
| *H01Q 3/24* | (2006.01) | |
| *H01Q 3/46* | (2006.01) | |

(56) References Cited

U.S. PATENT DOCUMENTS

| | | | | |
|---|---|---|---|---|
| 2009/0296663 | A1* | 12/2009 | Wild | H01Q 1/246 370/335 |
| 2015/0237510 | A1* | 8/2015 | Kludt | H04W 16/28 370/328 |
| 2016/0359531 | A1* | 12/2016 | Suh | H04B 7/0452 |
| 2017/0156067 | A1* | 6/2017 | Huang | H04W 16/28 |
| 2018/0062770 | A1 | 3/2018 | Reial et al. | |
| 2018/0132217 | A1* | 5/2018 | Stirling-Gallacher | H04B 7/0417 |
| 2018/0132252 | A1 | 5/2018 | Islam et al. | |
| 2018/0351605 | A1* | 12/2018 | Liang | H04B 7/0452 |
| 2018/0375558 | A1* | 12/2018 | Takahashi | H04B 7/0617 |

* cited by examiner

Receiving (obtaining), by a beamforming network of a node, a plurality of communication signals and generating a plurality of delayed signals, wherein each of the plurality of delayed signals is a delayed version of a one of the plurality of communication signals
610

Generating, by an antenna array of the node, an antenna pattern that includes a plurality of beams, wherein a direction of each of the plurality of beams is determined by signal delays of the beamforming network, wherein the plurality of beams are divided into a plurality of groups, wherein each group includes a subset of the plurality of beams
620

Selecting or receiving, by a controller of the node, a selection of a beam from a first group of the plurality of groups to correspond with a beam from another group of the plurality of groups
630

Controlling, by the controller of the node, simultaneous communication of the node with a plurality of transceivers, including the node communicating over a selected time and over at least a selected wireless transmission frequency range with a first transceiver through the selected beam of the first group and simultaneously the node communicating over at least a portion of the selected time and over at least a portion of the selected wireless transmission frequency range with another transceiver through the corresponding beam of the other group
640

FIGURE 6

SIMULTANEOUS COMMUNICATION THROUGH MULTIPLE BEAMS OF A WIRELESS NODE

RELATED APPLICATIONS

This patent application claims priority to U.S. Provisional Patent Application Ser. No. 62/524,424 filed Jun. 23, 2017, which is herein incorporated by reference.

FIELD OF THE DESCRIBED EMBODIMENTS

The described embodiments relate generally to wireless communications. More particularly, the described embodiments relate to systems, methods and apparatuses for simultaneous communication through multiple beams of a wireless node.

BACKGROUND

At least some multiple antenna systems operate to form beams for enhanced communication between wireless devices.

It is desirable to have methods apparatuses, and systems for simultaneous communication through multiple beams of a wireless node.

SUMMARY

An embodiment includes a node. The node includes a beamforming network, an antenna array, and a controller. The beamforming network operates to obtain (receive) a plurality of communication signals and generate a plurality of delayed signals, wherein each of the plurality of delayed signals is a delayed version of a one of the plurality of communication signals. The antenna array operates to generate an antenna pattern that includes a plurality of beams, wherein a direction of each of the plurality of beams is determined by signal delays of the beamforming network, wherein the plurality of beams are divided into a plurality of groups, and wherein each group includes a subset of the plurality of beams. The controller operates to select or receive a selection of a beam from a first group of the plurality of groups to correspond with a beam from another group of the plurality of groups, and control simultaneous communication of the node with a plurality of transceivers, including the node communicating over a selected time and over at least a selected wireless transmission frequency range with a first transceiver through the selected beam of the first group and simultaneously the node communicating over at least a portion of the selected time and over at least a portion of the selected wireless transmission frequency range with another transceiver through the corresponding beam of the other group.

Another embodiment includes a method. The method includes obtaining (receiving), by a beamforming network of a node, a plurality of communication signals and generating a plurality of delayed signals, wherein each of the plurality of delayed signals is a delayed version of a one of the plurality of communication signals, generating, by an antenna array of the node, an antenna pattern that includes a plurality of beams, wherein a direction of each of the plurality of beams is determined by signal delays of the beamforming network, wherein the plurality of beams are divided into a plurality of groups, wherein each group includes a subset of the plurality of beams, selecting or receiving, by a controller of the node, a selection of a beam from a first group of the plurality of groups to correspond with a beam from another group of the plurality of groups, and controlling, by the controller of the node, simultaneous communication of the node with a plurality of transceivers, including the node communicating over a selected time and over at least a selected wireless transmission frequency range with a first transceiver through the selected beam of the first group and simultaneously the node communicating over at least a portion of the selected time and over at least a portion of the selected wireless transmission frequency range with another transceiver through the corresponding beam of the other group.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 6 is a flow chart that includes steps of a method, according to an embodiment.

DETAILED DESCRIPTION

The embodiments described include methods, apparatuses, and systems for simultaneous communication with multiple transceivers through multiple beams of a wireless node. For at least some embodiments, beams of a beamforming pattern formed by an antenna array of a wireless node are divided into groups of beams. For an embodiment, a beam of a first group is selected to be associated with a beam of a different group. For an embodiment, the wireless node simultaneously communicates with a first transceiver through the beam of the first group and with another transceiver through the beam of the different group. For an embodiment, the simultaneous communication is over selected frequency band. For an embodiment, the simultaneous communication occurs over at least a selected period of time. For an embodiment, beams of different groups are selected to be associated with each other based on a level of interference between the beams. For an embodiment, a calibration process is performed to determine a level of interference between the beams, and select which beam of each group is to be associated with which beam of other groups. Further, for an embodiment, the groups are selected based upon a level of isolation between the beams of the different groups. The isolation can be determined or set by a physical displacement between antennas associated with the groups of beams.

Figure 1:
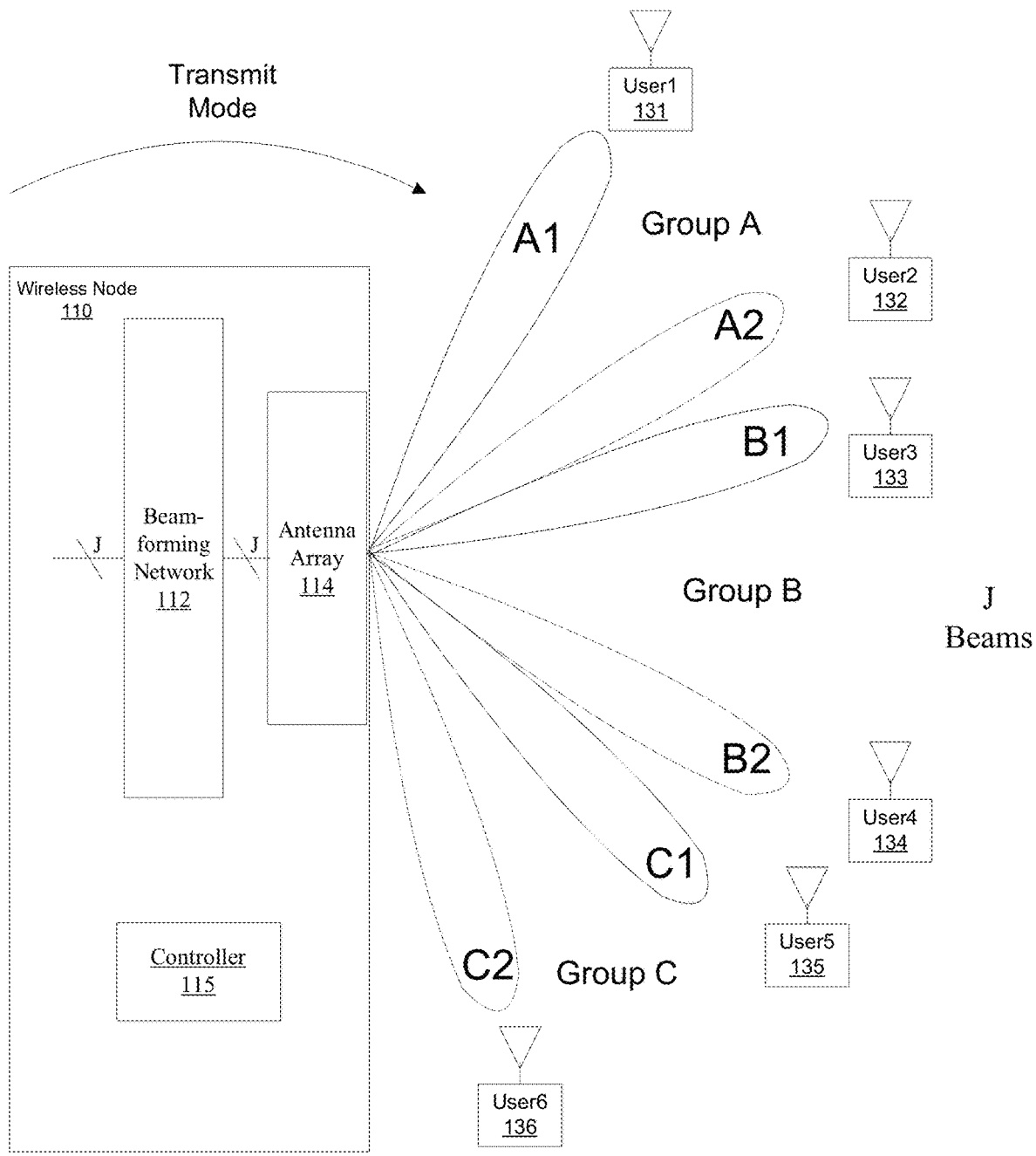
FIG. 1 shows a beamforming system that includes a wireless node simultaneously communicating with a plurality of transceivers through a plurality of beams by transmitting the communication signals, according to an embodiment.

FIG. 1 shows a beamforming system that includes a wireless node 110 simultaneously communicating with a plurality of transceivers 131-136 through a plurality of beams (A1, A2, B1, B2, C1, C2) by transmitting the communication signals, according to an embodiment. The beamforming system includes a beamforming network 112. For an embodiment, the beamforming network 112 operates to receive a plurality of communication signals and generate a plurality of delayed signals, wherein each of the plurality of delayed signals is a delayed version of a one of the plurality of communication signals. Further, the beamforming system includes an antenna array 114. For an embodiment, the antenna array 114 operates to generate an antenna pattern that includes a plurality of beams, wherein a direction of each of the plurality of beams is determined by signal delays of the beamforming network 112. For an embodiment, the plurality of beams is divided into a plurality of groups, wherein each group includes a subset of the plurality of beams.

As shown in FIG. 1, for an embodiment the wireless node 110 is in a transmit mode in which the beamforming network 112 receives a plurality of input (communication) signals and generates a plurality of output signals, wherein each of the plurality of output signals is a delayed version of a one of the plurality of input signals.

For an embodiment, the antenna array 114 receives the plurality of output signals (delayed communication signals) and generates an antenna pattern that includes the plurality of beams (A1, A2, B1, B2, C1, C2), wherein a direction of each of the plurality of beams (A1, A2, B1, B2, C1, C2) is determined by the beamforming network 112. Further, for an embodiment, the plurality of beams is divided into a plurality of groups A, B, C wherein each group A, B, C includes a subset of the plurality of beams. For example, the group A includes the beams A1 and A2, the group B includes the beams B1, B2, and the group C includes the beams C1, C2. For an embodiment, the groups of beams are selected or set based upon a level of isolation between the beams of the different groups.

Figure 2:
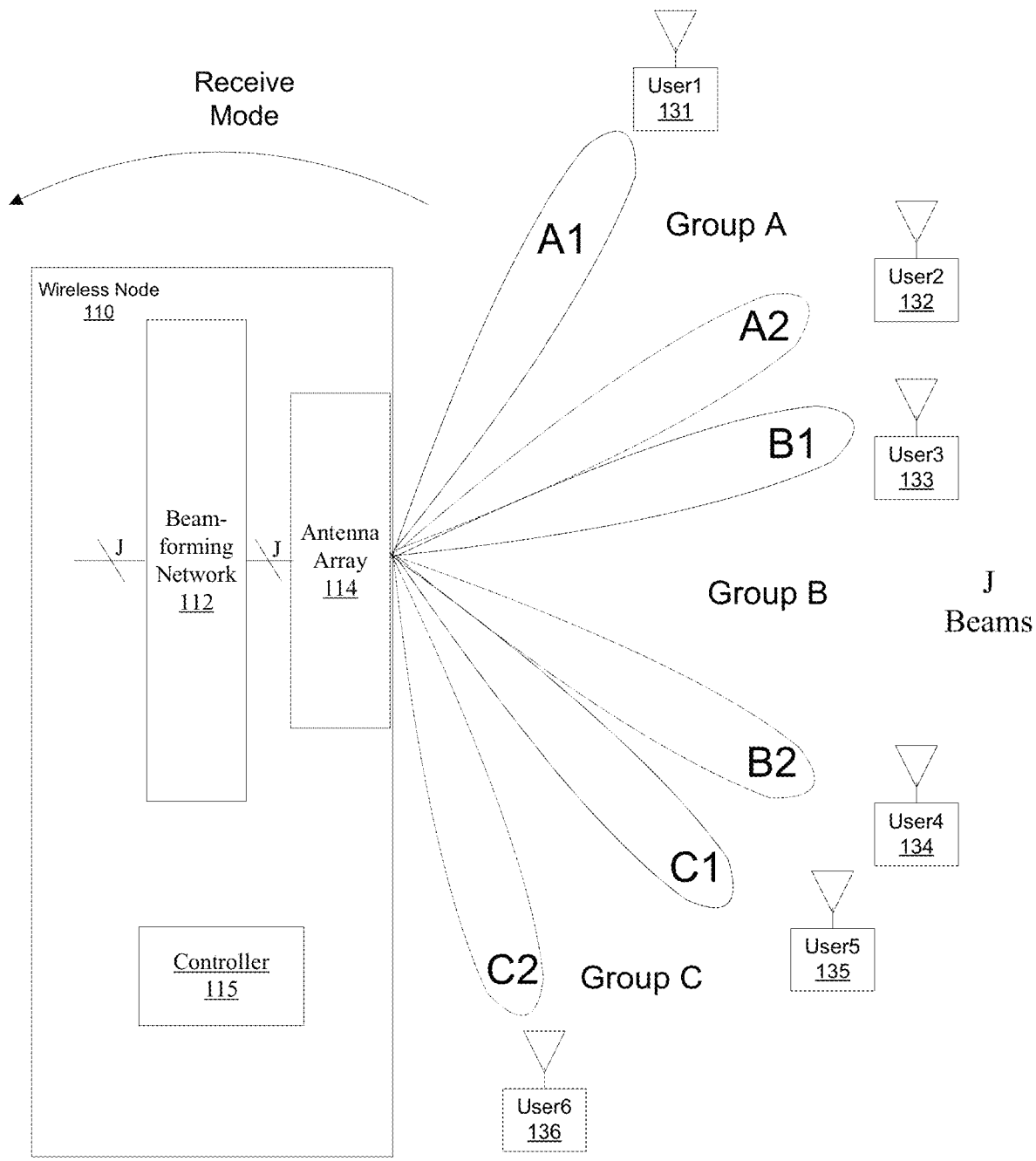
FIG. 2 shows a beamforming system that includes a wireless node simultaneously communicating with a plurality of transceivers through a plurality of beams by receiving the communication signals, according to an embodiment.

FIG. 2 shows a beamforming system that includes a wireless node 110 simultaneously communicating with a plurality of transceivers 131-136 through a plurality of beams (A1, A2, B1, B2, C1, C2) by receiving the communication signals, according to an embodiment. For an embodiment, the beamforming network 112 receives a plurality of received (communication) signals from the antenna array 114, and generates a plurality of delayed received signals, wherein each of the plurality of delayed received signals is a delayed version of a one of the plurality of received signals. The delays of the of the beamforming network 112 facilitates the formation of the antenna pattern that includes the plurality of beams (A1, A2, B1, B2, C1, C2), wherein a direction of each of the plurality of beams (A1, A2, B1, B2, C1, C2) is determined by the beamforming network 112. Further, for an embodiment, the plurality of beams is divided into a plurality of groups A, B, C wherein each group A, B, C includes a subset of the plurality of beams. For example, the group A includes the beams A1 and A2, the group B includes the beams B1, B2, and the group C includes the beams C1, C2. For an embodiment, the groups of beams are selected or set based upon a level of isolation between the beams of the different groups.

For an embodiment, the wireless node 110 further includes a controller 115. For an embodiment, the controller 115 operates to select or receive a selection of a beam from a first group of the plurality of groups to correspond with a beam from another group of the plurality of groups, and control simultaneous communication of the node 110 with a plurality of transceivers, including the node 110 communicating with a first transceiver 131 through the selected beam (for example, beam A1) of the first group A and simultaneously the node 110 communicating with another transceiver (for example, transceiver 133) through the corresponding beam (for example, beam B1) of the other group (for example, group B).

For an embodiment, the wireless node 110 is in a transmit mode, and the beamforming network 112 receives J signal streams and generates J output signal streams, wherein the J output streams are delayed versions of the plurality of input signals (the received signal streams). Further, for an embodiment, the antenna array generates a beamforming pattern that includes J beams, wherein a beam corresponds with each of the J inputs to the beamforming network 112.

For an embodiment, the wireless node is in a receive mode, and the beamforming network 112 receives J received signal streams from the antenna array 114, and generates J delayed received signal streams, wherein the J delayed received streams are delayed versions of the plurality of received signals (the received through the beams of the antenna pattern). Further, for an embodiment, the antenna array generates a beamforming pattern that includes J beams, wherein a beam corresponds with each of the J received streams to the beamforming network 112.

For an embodiment, each of the beams has its own unique direction, thereby providing the node 110 with the ability to communicate with one or more transceivers in each of the different directions as defined by the directions of the beams formed by the antenna or beamforming pattern.

While three groups of beams A, B, C are shown in FIGS. 1 and 2, it is to be understood that there can be any number of groups of beams included within the beamforming pattern created by the antenna array 114 and the beamforming network 112. Further, while only two beams are shown as being included within each of the groups A, B, C, it is to be understood that any number of beams can be included within each of the groups.

For an embodiment, a beam from a first group is selectively associated with a beam of a different group. As previously described, for an embodiment, the controller 115 operates to select or receive a selection of a beam from a first group to correspond with a beam from another group of the plurality of groups. For example, the beam A1 of the group A can be selected to facilitate communication between the wireless node 110 and a first transceiver 131 simultaneously with the beam B1 of the group B facilitating communication between the wireless node 110 and a third transceiver 133. Further, the beam A1 of the group A can be selected to facilitate communication between the wireless node 110 and the first transceiver 131 simultaneously with the beam B1 of the group B facilitating communication between the wireless node 110 and the third transceiver 133, and the beam C1 of the group C facilitating communication between the wireless node 110 and a fifth transceiver 135.

Further, for example, the beam A2 of the group A can be selected to facilitate communication between the wireless node 110 and a second transceiver 132 simultaneously with the beam B2 of the group B facilitating communication between the wireless node and a fourth transceiver 134. Further, the beam A2 of the group A can be selected to facilitate communication between the wireless node 110 and the first transceiver 131 simultaneously with the beam B2 of the group B facilitating communication between the wireless node and the fourth transceiver 134, and the beam C2 of the group C facilitating communication between the wireless node and a sixth transceiver 136.

For an embodiment, the simultaneous communication includes wireless communication between the wireless node 110 and a plurality of transceivers over a common frequency band. That is, the wireless communication includes electromagnetic waves operating over a band of frequencies, and the simultaneous wireless communication includes the band of frequencies of one beam of a first group overlapping or covering the band of frequencies of the corresponding beam of another group. Further, for an embodiment, the simultaneous communication occurs over at least a common time period. That is, for an embodiment, the simultaneous communication includes wireless communication over a common or at least overlapping time period. The spatially separate beams provide spatial separation, and therefore, time and/or frequency separation can be avoided.

Selecting Beam Correspondence

As described, beams of one group of the plurality of groups of beams are selected to correspond with one or more beams of other groups of the plurality of groups of beams. As described, beams that are selected to correspond or be associated with each other are used to provide simultaneous communicated between the wireless node 110 and a plurality of transceivers. For an embodiment, the selection of corresponding beams of the different groups is based on a level of measured, estimated, or determine interference between the different beams. For an embodiment, the selection process includes matching beams to be corresponding if the interference between the beams is less than a threshold. For an embodiment, the selection process includes matching beams to be corresponding if the matching allows matching of other beams within the groups to be less than a threshold. For an embodiment, the selection process includes matching beams to be corresponding if isolation between the beams is greater than a threshold.

For an embodiment, the beams from the different groups are selected to provide the least amount of interference between wireless signals communicated using the selected beams. Given that fact that there are multiple beams within each group, an embodiment includes selecting beams of different groups to correspond based on whether the interference between wireless signals being communicated utilizing the beams is less than a threshold. That is, for any particular set of corresponding beams, the beams having the least amount of interference may not be selected, but the corresponding beams may be selected if the interference between the beams is less than a threshold. Further, beams from multiple groups may be selected to be corresponding with each other. That is, beams from more than two different groups can be selected to be corresponding beams.

Group Selection

As described, for an embodiment, the plurality of beams of the antenna or beam forming pattern generated by the beamforming network 112 and the antenna array 114 are divided into groups of beams, wherein each group includes a subset of the total number of beams. For an embodiment, the groups selections are based on a number of available beams.

For an embodiment, the groups of beams are selected or set based upon a level of interference between the beams of the different groups. That is, the beam are selected for groups based on the level of interference between them. For an embodiment, the groups are selected based upon physical characteristics of the antenna array. For an embodiment, beams selections are made by a set of switches, and the switches define the groups of beams. That is, for an embodiment, a specific switch corresponds with each switch.

Figure 3:
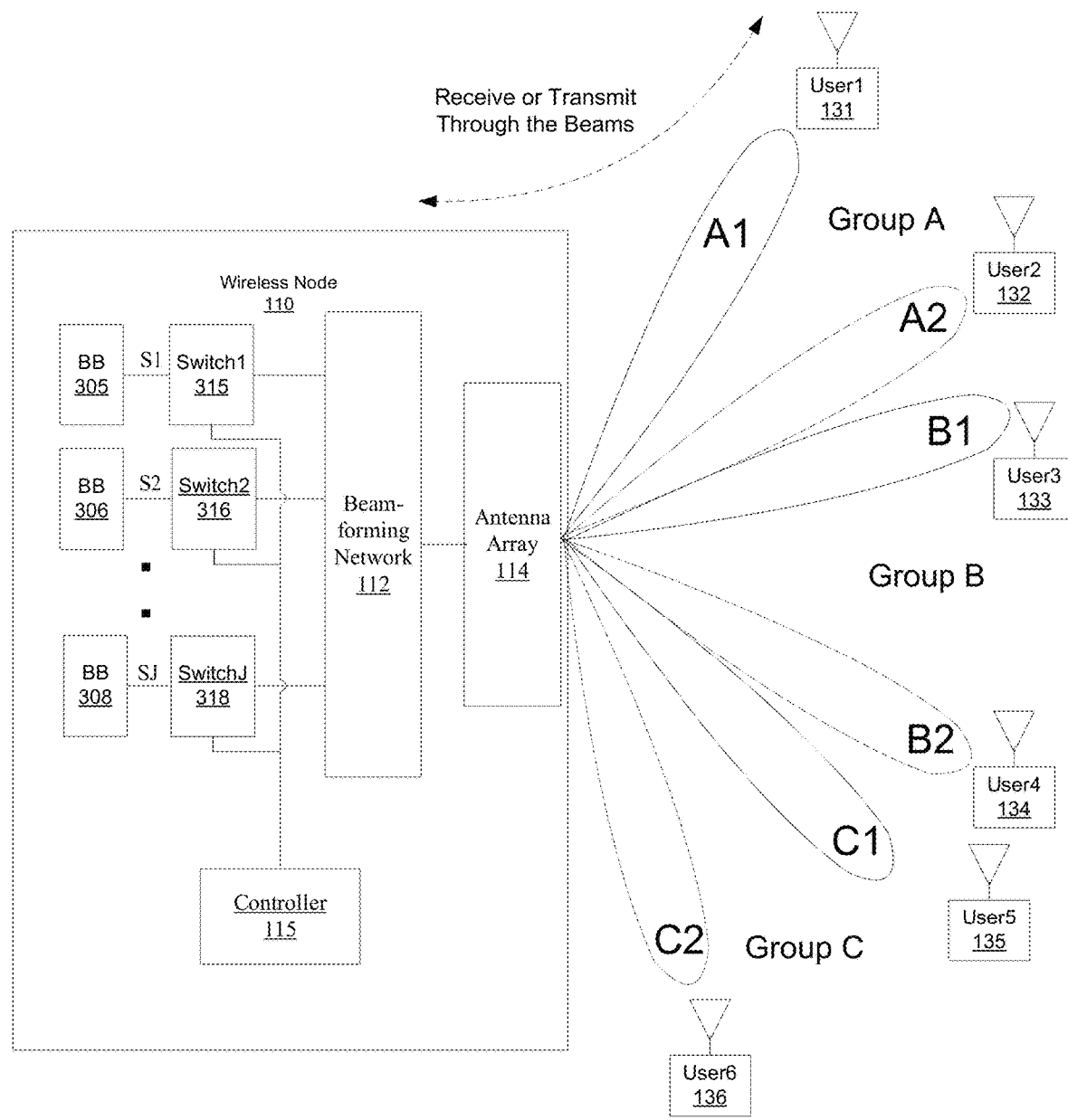
FIG. 3 shows a beamforming system that includes a wireless node simultaneously communicating with a plurality of transceivers through a plurality of beams, wherein group switches are associated with the groups of beams, according to an embodiment.

FIG. 3 shows a beamforming system that includes a wireless node 110 simultaneously communicating with a plurality of transceivers through a plurality of beams, wherein groups of beams are defined by group switches 315, 316, 318, according to an embodiment. For an embodiment, a first switch 315 corresponds with the first group, and the first switch 315 selectively determines which beam of the first group the wireless node 310 utilizes in transmitting a first stream S1 to the first transceiver 131 or to the second transceiver 132, or receiving the first stream S1 from the first transceiver 131 or the second transceiver 132. For an embodiment, a second switch 316 corresponds with the second group, and the second switch 316 selectively determines which beam of the second group the wireless node 110 utilizes in transmitting a second stream S2 to the third transceiver 133 or to the fourth transceiver 134, or receiving the second stream S2 from the third transceiver 133 or the fourth transceiver 134. For an embodiment, a Jth switch 318 corresponds with an Jth group, and the Jth switch 318 selectively determines which beam of the Jth group the wireless node 110 utilizes in transmitting a Jth stream SJ to, for example, the fifth transceiver 135 or to the sixth transceiver 136, or receiving the Jth stream SJ from the fifth transceiver 135 or the sixth transceiver 136.

For an embodiment, the controller 115 selects the setting of the group switches 315, 316, 318. As previously described, for an embodiment, the controller 115 operates to select or receive a selection of a beam from a first group to correspond with a beam from another group of the plurality of groups. Further, the controller 115 operates to select or receive selections of other beams of the plurality of groups that each correspond with other beams of other groups. As described, for an embodiment, the selection is based on a level of interference between the different beams of the different groups.

FIG. 3 additionally includes baseband processors 304, 305, 308, which generate or receive data streams S1, S2, SJ corresponding with each of the switches 351, 316, 318.

When in the transmitting mode, for an embodiment, each switch of the plurality of switches 305, 306, 308 corresponds with each of the groups, wherein during communication of wireless signals each switch receives an input stream of data, and generates a subset of the plurality of communication signals to the beamforming network 112. Further, each switch controls which beam of the corresponding group is being used to facilitate communication between the node and a transceiver. For example, the first switch 315 can control whether the beam (A1 or A2) of the first group is transmitting to the first transceiver 131 or the second transceiver 132. Further, the second switch 316 controls whether the beam (B1 or B2) of the second group is transmitting to the third transceiver 133 or the fourth transceiver 134.

When in the receiving mode, for an embodiment, each switch of the plurality of switches 305, 306, 308 corresponds with each of the plurality of groups, wherein during reception of the plurality of communication signals from the plurality of transceivers each switch receives a plurality of signals from the beamforming network 112, and generates a stream of data, and wherein each switch controls which beam of the corresponding group is being used to facilitate communication. For example, the first switch 315 can control whether the beam (A1 or A2) of the first group is receiving from the first transceiver 131 or the second transceiver 132. Further, the second switch 316 controls whether the beam (B1 or B2) of the second group is receiving from the third transceiver 133 or the fourth transceiver 134.

Figure 4:
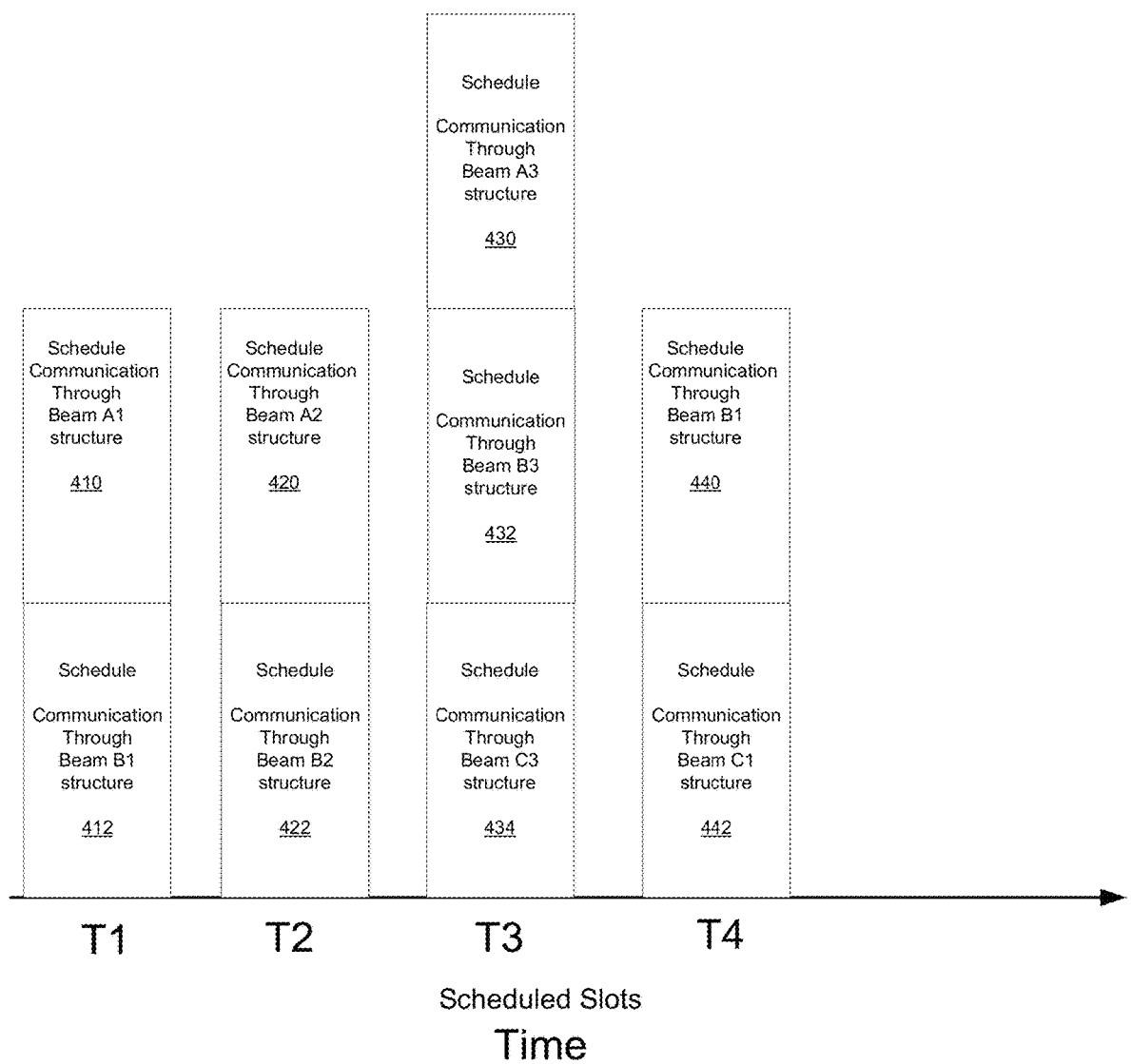
FIG. 4 shows a time-line of scheduled communication between the wireless node and at least some of the wireless transceivers, according to an embodiment.

FIG. 4 shows a time-line of scheduled communication between the wireless node and at least some of the wireless transceivers, according to an embodiment. The time-line shows that for a first time slot T1 the wireless node communicates through the beam A1 410 simultaneously with the wireless node communicating through the beam B1 412. Further, the time-line shows that for a second time slot T2 the wireless node communicates through the beam A2 420 simultaneously with the wireless node communicating through the beam B2 422. Further, the time-line shows that for a second time slot T3 the wireless node communicates through the beam A3 430 simultaneously with the wireless node communicating through the beam B3 432 and the beam C3 434. Further, the time-line shows that for a fourth time slot T4 the wireless node communicates through the beam B1 440 simultaneously with the wireless node communicating through the beam C1 442.

As previously described, for at least some embodiments the simultaneous communication occurs over a common frequency band. That is, for each of the time slots T1, T2, T3, T4, T5 the wireless communication signals occupy a common or at least overlapping frequency band. Further, while the simultaneous communication is shown as occurring over time slots, the simultaneous may only occupy portions of such time slots.

Figure 5:
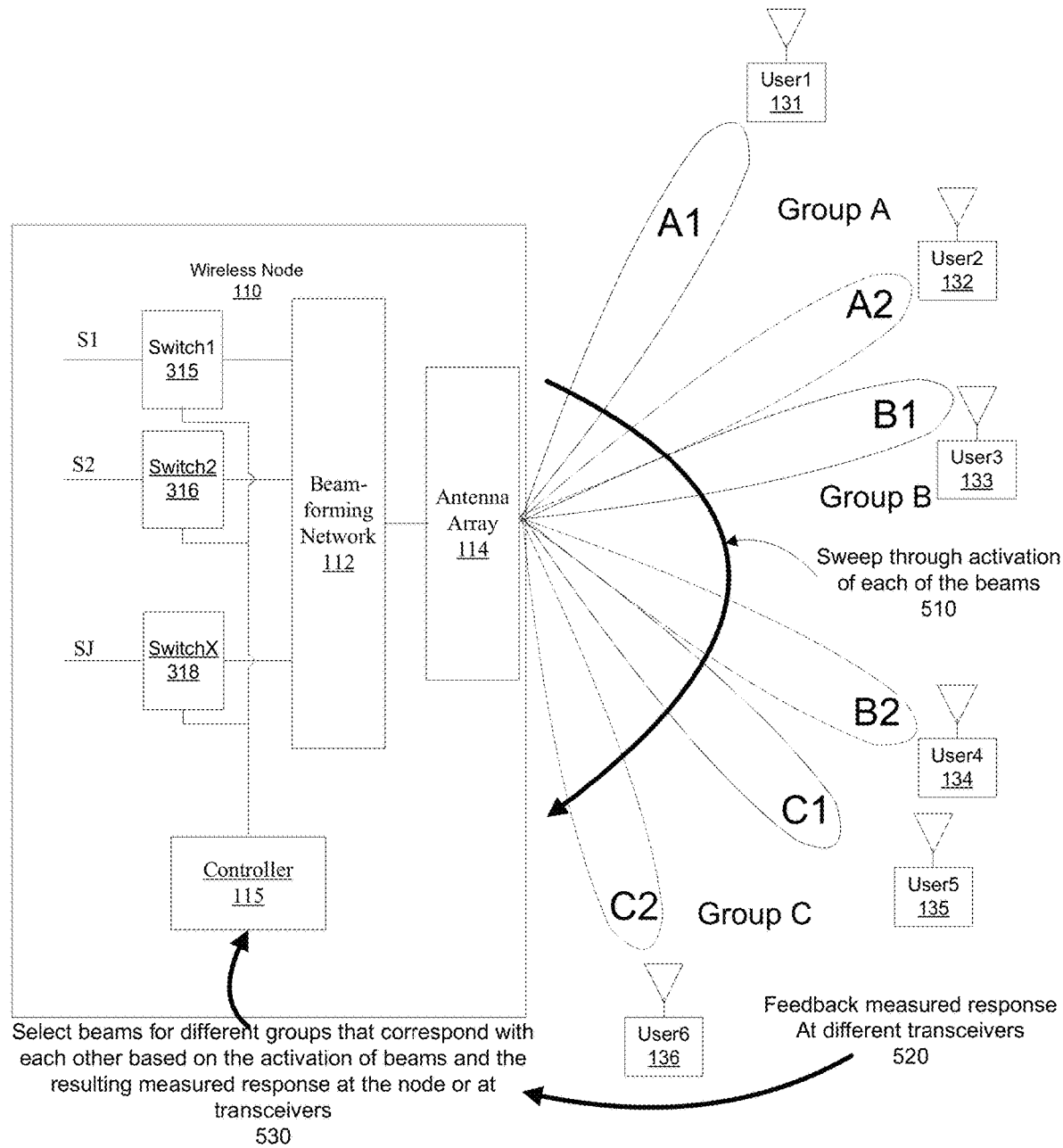
FIG. 5 shows a beamforming system that is calibrated to determine interference between beams of different groups of beams, according to an embodiment.

FIG. 5 shows a beamforming system that is calibrated to determine interference between beams of different groups of beams, according to an embodiment. For an embodiment, the wireless node 110 operates to sweep 510 through the different possible beam which include sequentially (or any other order) activating each beam. For an embodiment, while the wireless node 110 is performing the sweep, each of the transceivers 131-136 measure a received response for each of the activated beams. That is, the wireless node 110 transmits a wireless signal (which can include a known training signal) while the wireless node 110 sweeps through activated beams, and transceivers that receive the wireless signal measure, for example, a received signal power level. For another embodiment, while the wireless node 110 is performing the sweep, the wireless node measures a received response for each of the activated beams. That is, the wireless transceivers transmit wireless signals (which can include a known training signal) while the wireless node 110 sweeps through activated beams, and the wireless node 110 measures, for example, a received signal power level. Based on known characteristics of the wireless signal and based on the measured signal quality of the received signals, an estimation of the link quality (or level of interference between wireless signals communicated) between the wireless node 110 and each of the transceivers can be determined.

For an embodiment, after the sweep, either the wireless node 110 or each of the transceivers 131-136 has obtained a measured response for each of the possible beams. For another embodiment, after the sweep, the wireless node has directly obtained a measured response for each of the possible beams.

For an embodiment, the measured responses of the transceivers 131-136 is feedback 520 to an external controller or to the controller 115 of the wireless node 110. This allows for determination of a link quality between the wireless node 110 and each of the transceivers 131-136 for each of the different beam settings A1, A2, B1, B2, C1, C2.

For an embodiment, a level of interference between each of the beams for each of the groups is determined based on the determined link quality between the wireless node 110 and each of the transceivers 131-136 for each of the different beam settings A1, A2, B1, B2, C1, C2.

It is to be understood that the sweeping calibration method described is an example of a process that can be used to determine the link quality between the wireless node 110 and each of the transceivers 131-136 for each of the different beam settings A1, A2, B1, B2, C1, C2. That is, the process does not have to be a sweep, and may not include all of the beam settings. For example, past communication between the wireless node 110 and the transceivers 131-136 may indicate that one or more of the transceivers 131-136 will not ever have a link quality above or below a threshold with selected beam settings. Therefore, testing or calibration of these beam settings may be selectively not be performed.

For an embodiment, beams for different groups that correspond with each other are selected based on the activation of the beams and the resulting measured responses at the transceivers 131-136. The controller 115 of the wireless node 110 then selects the settings of the switches 315, 316, 318 based upon the selected corresponding beams of each group of the plurality of beams.

At least some embodiments include sensing a change in link quality between the node and at least one transceiver, and re-characterizing the interference between beams of different of the plurality of groups of beams. For an embodiment, the sensed change includes a baseband processor (such as, at least one of baseband processors 304, 305, 308) sensing or measuring RSSI (receive signal strength indicator) or an SNR (signal-to-noise ratio) of signals received by the wireless node 110. Of course equivalent measurement of sensing could additionally or alternatively be performed at the transceivers 131-136.

FIG. 6 is a flow chart that includes steps of a method, according to an embodiment. A first step 610 includes receiving (or obtaining), by a beamforming network of a node, a plurality of communication signals and generating a plurality of delayed signals, wherein each of the plurality of delayed signals is a delayed version of a one of the plurality of communication signals. A second step 620 includes generating, by an antenna array of the node, an antenna pattern that includes a plurality of beams, wherein a direction of each of the plurality of beams is determined by signal delays of the beamforming network, wherein the plurality of beams are divided into a plurality of groups, wherein each group includes a subset of the plurality of beams. A third step 630 includes selecting or receiving, by a controller of the node, a selection of a beam from a first group of the plurality of groups to correspond with a beam from another group of the plurality of groups. A fourth step 640 includes controlling, by the controller of the node, simultaneous communication of the node with a plurality of transceivers, including the node communicating over a selected time and over at least a selected wireless transmission frequency range with a first transceiver through the selected beam of the first group and simultaneously the node communicating over at least a portion of the selected time and over at least a portion of the selected wireless transmission frequency range with another transceiver through the corresponding beam of the other group.

As previously described, an embodiment includes receiving, by each switch of a plurality of switches of the node, an input stream of data, and generating, by each switch of the plurality of switches of the node, a subset of the plurality of communication signals, wherein the each switch controls which beam of the corresponding group is being used to facilitate communication between the node and a transceiver, and wherein each switch of the plurality of switches corresponds with each of the groups.

As previously described, an embodiment includes receiving, by each of the plurality of switches, the plurality of communication signals from the beamforming network, and generating, by each switch of the plurality of switches of the node, a stream of data, and wherein each switch controls which beam of the corresponding group is being used to facilitate communication between the node and a transceiver of the plurality of transceivers.

For an embodiment, a beam of each of multiple groups of beams is directed to a one of the plurality of transceivers. That is, each beam has its own corresponding direction. For that direction, the node may communicate with one or more transceivers. The communication can include TDD (time division duplex) to allow the node to communicate with multiple transceivers with a single beam direction.

As previously described, at least some embodiments further include selecting which beam of the first group communicates with the first transceiver simultaneously with the node communicating with a second transceiver with a beam of the other group. For an embodiment, the selection of which beam of the first group communicates with the first transceiver simultaneously with the node communicating with the second transceiver with the beam of the second group is based on a characterization of interference between each beam of the first group and each beam of the second group. An embodiment includes characterizing, by the node, interference between beams of different of the plurality of groups of beams. For an embodiment, characterizing, by the node, interference between beams of different of the plurality of groups of beams comprising sweeping operation of each beam and characterizing a link quality between the node and each of a plurality of transceivers. For an embodiment, characterizing, by the node, interference between beams of different of the plurality of groups of beams includes transmitting a signal (for example, a training signal) through each beam one at a time, and measuring a signal quality at each of the plurality of transceivers for the transmitted signal for each of the beams. For at least some embodiments, characterizing interference between the beams of each of the different plurality of groups based on the measured signal qualities at each of the plurality of transceivers. For another embodiment, characterizing, by the node, interference between beams of different of the plurality of groups of beams includes the node receiving a signal through each beam one at a time from one or more of the transceivers, and measuring a signal quality at the node. For an embodiment, the received signal includes a training signal. For an embodiment, the training signal are transmitted having known characteristics that can be compared with a received version of the training signal. The comparison allows for characterization of the wireless link the training signal propagated through before being received.

At least some embodiments include sensing a change in link quality between the node and at least one transceiver, and re-characterizing the interference between beams of different of the plurality of groups of beams.

Figure 7:
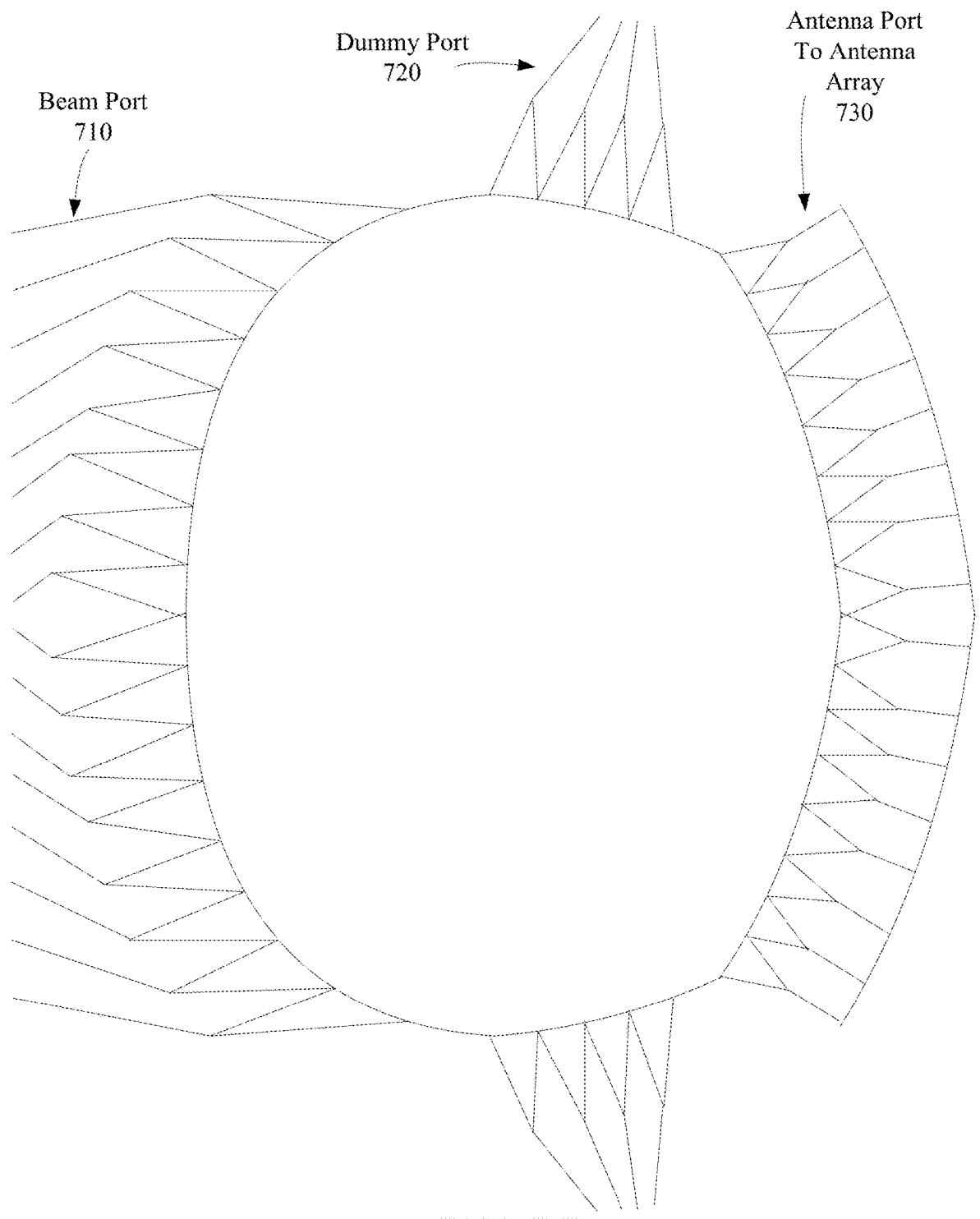
FIG. 7 shows a beamforming network that includes a Rotman lens, according to an embodiment.

FIG. 7 shows a beamforming network that includes a Rotman lens, according to an embodiment. As shown, the Rotman lens receives at a beam port 710 a plurality of input signals (16 are shown) and produces a plurality of output signals (16 are shown) at an antenna port 730. The plurality of output signals are connected to an antenna array, which forms beamforming pattern according to the delays introduced by the Rotman lens.

The Rotman lens is a true time-delay passive structure that enables an antenna array to generate multiple simultaneous fixed beams using a shared aperture. For an embodiment, the Rotman lens allows multiple antenna beams to be formed without the need for switches or phase shifters. For an embodiment, antenna elements are connected to the antenna port 730 with input signals connected to the beam port 710.

When the antenna elements of the antenna array are provided with electromagnetic signals at phases that vary linearly across a row, the antenna array behaves like a phased array.

One noteworthy property of the Rotman lens is that even though there are many ports connected to the Rotman lens, the ports are isolated, in that loading of one port does not affect the loss (or noise figure) of beams of adjacent ports. The Rotman lens is more like a parallel-plate waveguide than a transmission line.

Figure 8:
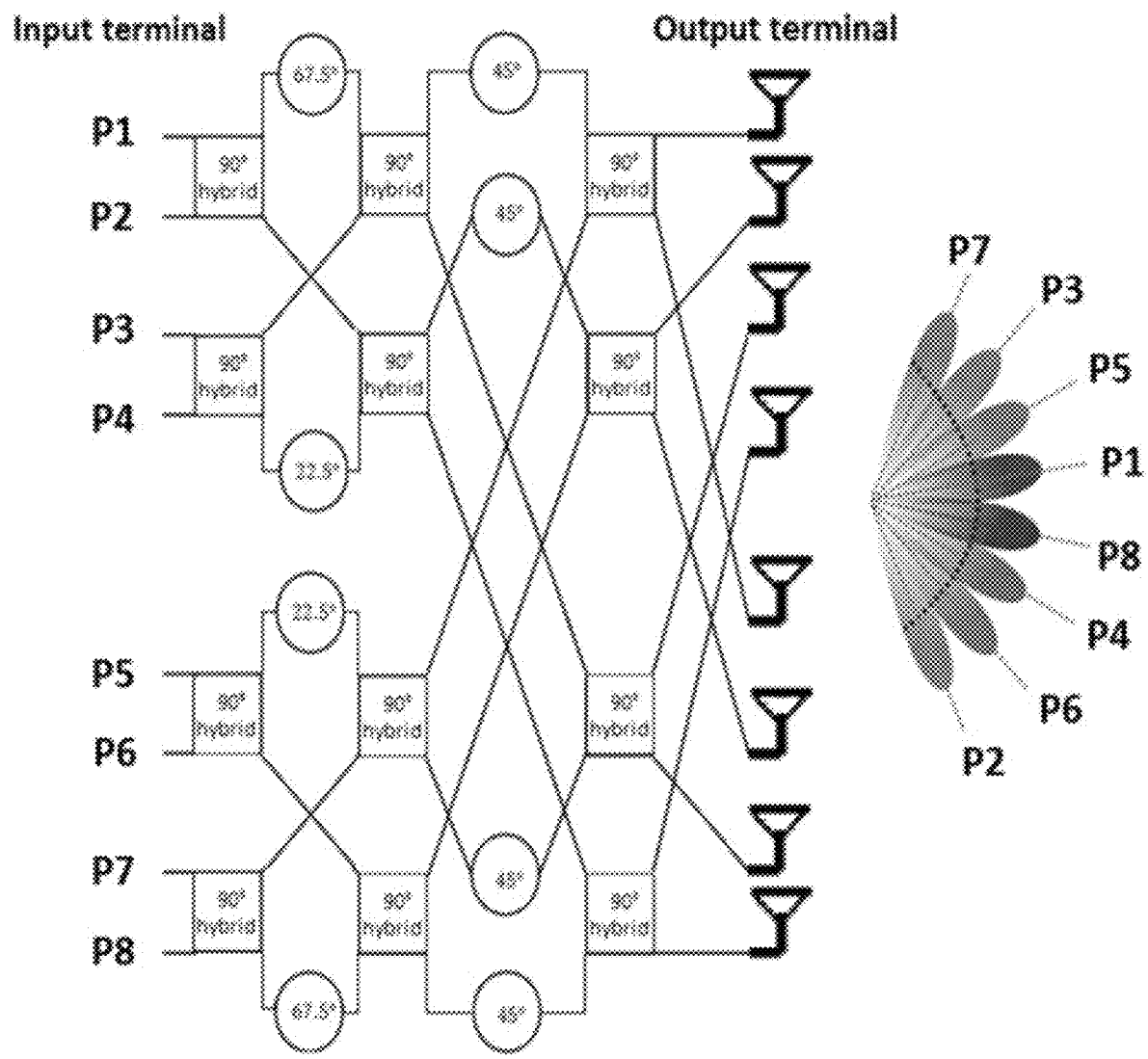
FIG. 8 shows a beamforming network that includes a Butler matrix, according to an embodiment.

FIG. 8 shows a beamforming network that includes a Butler matrix, according to an embodiment. As shown, this example of the Butler matrix includes eight inputs (P1-P8). The Butler matrix in conjunction with an antenna array generates a beamforming pattern that includes eight beams in which each beam includes a one of the eight input signals (P1-P8).

Figure 9:
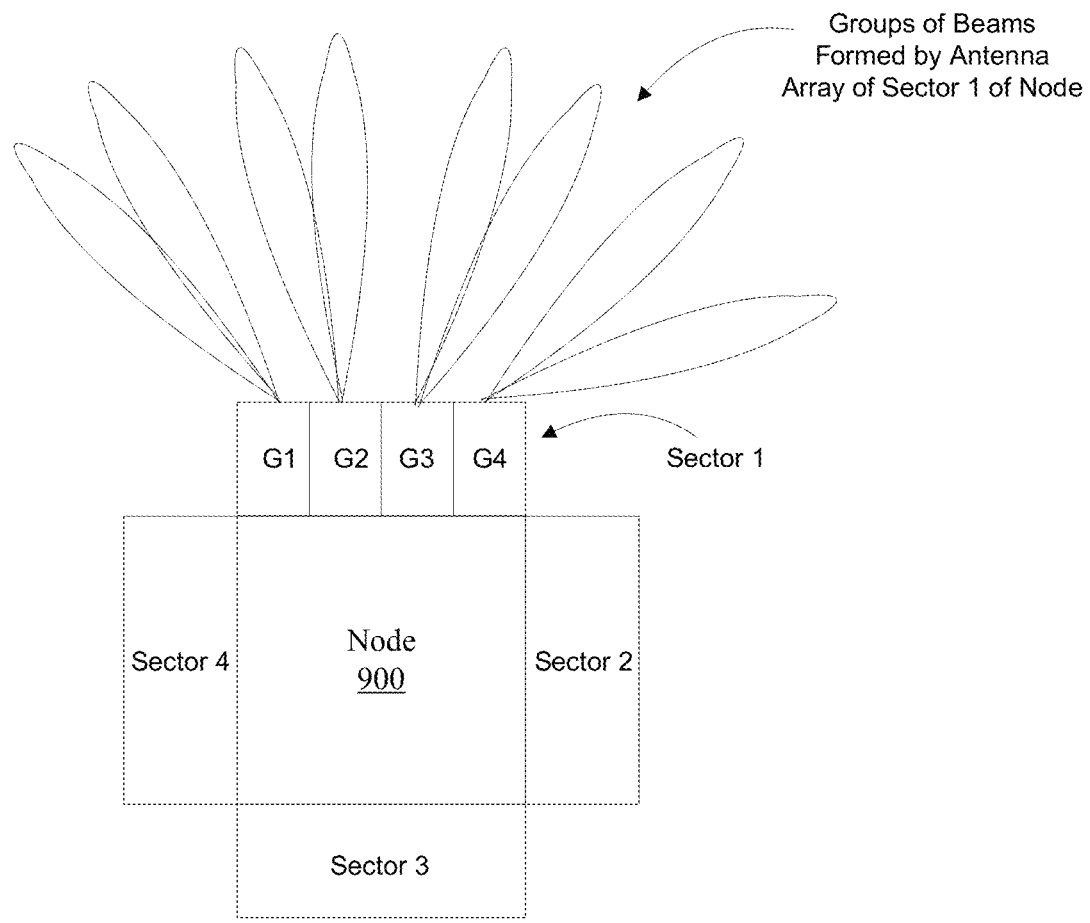
FIG. 9 shows a node that includes multiple sectors in which at least one of the sectors includes a plurality of groups of beams, according to an embodiment.

FIG. 9 shows a node 900 that includes multiple sectors (sector 1, sector 2, sector 3, sector 4) in which at least one of the sectors includes a plurality of groups of beams, according to an embodiment. For example, as shown, the sector 4 includes four groups of beams (G1, G2, G3, G4). For an embodiment, each of the sectors includes at least one beamforming network. Each of the groups include multiple beams as defined by the beamforming network of the sector. For an embodiment, multiple of the sectors include a beamforming network and an antenna array, and include multiple groups of beams.

Although specific embodiments have been described and illustrated, the embodiments are not to be limited to the specific forms or arrangements of parts so described and illustrated. The described embodiments are to only be limited by the claims.

What is claimed:

1. A node, comprising:
a beamforming network, the beamforming network operates to receive a plurality of communication signals and generates a plurality of delayed signals, wherein each of the plurality of delayed signals is a delayed version of a one of the plurality of communication signals, wherein the beamforming network includes a true-time delay passive structure;
an antenna array, the antenna array operates to generate an antenna pattern that includes a plurality of fixed direction beams, wherein a direction of each of the plurality of fixed direction beams is determined by signal delays of the beamforming network, wherein the plurality of fixed direction beams are divided into a plurality of groups, wherein each group includes a subset of the plurality of fixed direction beams; and a controller, wherein the controller operates to:

characterize interference between beams of different groups of the plurality of groups of beams comprising the node operating to activate each beam of at least some of the plurality of fixed direction beams and characterizing a link quality between the node and each of a plurality of transceivers, wherein characterization of interference between the beams of the different groups is not performed based on past communication between the node and the plurality of transceivers;

select a beam from a first group of the plurality of groups to correspond with a beam from another group of the plurality of groups, wherein the beam of the first group is selected to correspond with the beam of the other group based on characterized interference between the beam of the first group and the beam of the other group; and control simultaneous communication of the node with the plurality of transceivers, including the node communicating over a selected time and over at least a selected wireless transmission frequency range with a first transceiver through the selected beam of the first group and simultaneously the node communicating over at least a portion of the selected time and over at least a portion of the selected wireless transmission frequency range with another transceiver through the corresponding beam of the other group.

2. The node of claim 1, a beam of each of multiple groups of beams is directed to a one of the plurality of transceivers.

3. The node of claim 2, further comprising a plurality of switches, wherein each switch of the plurality of switches corresponds with each of the groups, wherein during communication of wireless signals each switch obtains an input stream of data, and generates a subset of the plurality of communication signals to the beamforming network, and wherein each switch controls which beam of the corresponding group is being used to facilitate communication between the node and a transceiver.

4. The node of claim 2, further comprising a plurality of switches, wherein each switch of the plurality of switches corresponds with each of the plurality of groups, wherein during reception of the plurality of communication signals from the plurality of transceivers each switch obtains a plurality of signals from the beamforming network, and generates a stream of data, and wherein each switch controls which beam of the corresponding group is being used to facilitate communication between the node and a transceiver of the plurality of transceivers.

5. The node of claim 1, further the controller of the node, or an external controller, operating to select the beam of the first group to communicate with the first transceiver simultaneously with the node communicating with the other transceiver with the corresponding beam of the other group.

6. The node of claim 1, wherein the node operates to characterize interference between beams of different groups of the plurality of groups of beams.

7. The node of claim 6, wherein the node operating to characterize interference between beams of different groups of the plurality of groups of beams comprising the node operating to sweep through activation of each beam of the plurality of fixed direction beams and characterizing a link quality between the node and each of the plurality of transceivers.

8. The node of claim 6, wherein the node operating to characterize interference between beams of different groups of the plurality of groups of beams comprises communicating a signal through each beam of the plurality of fixed direction beams one at a time, and measuring a signal quality of the communicated signal for each of the beams.

9. The node of claim 8, further comprising characterizing interference between the beams of each of the different plurality of groups based on the measured signal qualities at each of the plurality of transceivers.

10. The node of claim 6, wherein the node further operates to:

sense a change in link quality between the node and at least one transceiver; and re-characterize the interference between beams of different groups of the plurality of groups of beams based on the sensing of the change in the link quality between the node and the at least one transceiver.

11. A method, comprising:

obtaining, by a beamforming network of a node, a plurality of communication signals and generating a plurality of delayed signals, wherein each of the plurality of delayed signals is a delayed version of a one of the plurality of communication signals, wherein the beamforming network includes a true-time delay passive structure;

generating, by an antenna array of the node, an antenna pattern that includes a plurality of fixed direction beams, wherein a direction of each of the plurality of fixed direction beams is determined by signal delays of the beamforming network, wherein the plurality of fixed direction beams are divided into a plurality of groups, wherein each group includes a subset of the plurality of fixed direction beams;

characterizing interference between beams of different groups of the plurality of groups of beams comprising the node operating to activate each beam of at least some of the plurality of fixed direction beams and characterizing a link quality between the node and each of a plurality of transceivers, wherein characterization of interference between the beams of the different groups is not performed based on past communication between the node and the plurality of transceivers;

selecting, by a controller of the node, a beam from a first group of the plurality of groups to correspond with a beam from another group of the plurality of groups, wherein the beam of the first group is selected to correspond with the beam of the other group based on characterized interference between the beam of the first group and the beam of the other group; and controlling, by the controller of the node, simultaneous communication of the node with the plurality of transceivers, including the node communicating over a selected time and over at least a selected wireless transmission frequency range with a first transceiver through the selected beam of the first group and simultaneously the node communicating over at least a portion of the selected time and over at least a portion of the selected wireless transmission frequency range with another transceiver through the corresponding beam of the other group.

12. The method of claim 11, wherein a beam of each of multiple groups of beams is directed to a one of the plurality of transceivers.

13. The method of claim 11, further comprising:

receiving, by each switch of a plurality of switches of the node, an input stream of data;

generating, by each switch of the plurality of switches of the node, a subset of the plurality of communication signals, wherein the each switch controls which beam of the corresponding group is being used to facilitate communication between the node and a transceiver, and wherein each switch of the plurality of switches corresponds with each of the groups.

14. The method of claim 11, further comprising:
receiving, by each of a plurality of switches, the plurality of communication signals from the beamforming network;
generating, by each switch of the plurality of switches of the node, a stream of data, and wherein each switch controls which beam of the corresponding group is being used to facilitate communication between the node and a transceiver of the plurality of transceivers.

15. The method of claim 14, further comprising characterizing, by the node, interference between beams of different groups of the plurality of groups of beams.

16. The method of claim 15, wherein characterizing, by the node, interference between beams of different groups of the plurality of groups of beams comprising a sweeping operation of each beam of the plurality of fixed direction beams and characterizing a link quality between the node and each of the plurality of transceivers.

17. The method of claim 16, wherein characterizing, by the node, interference between beams of different groups of the plurality of groups of beams comprises communicating a signal through each beam of the plurality of fixed direction beams one at a time, and measuring a signal quality of the communicated signal for each of the beams.

\* \* \* \* \*